Figure 1:
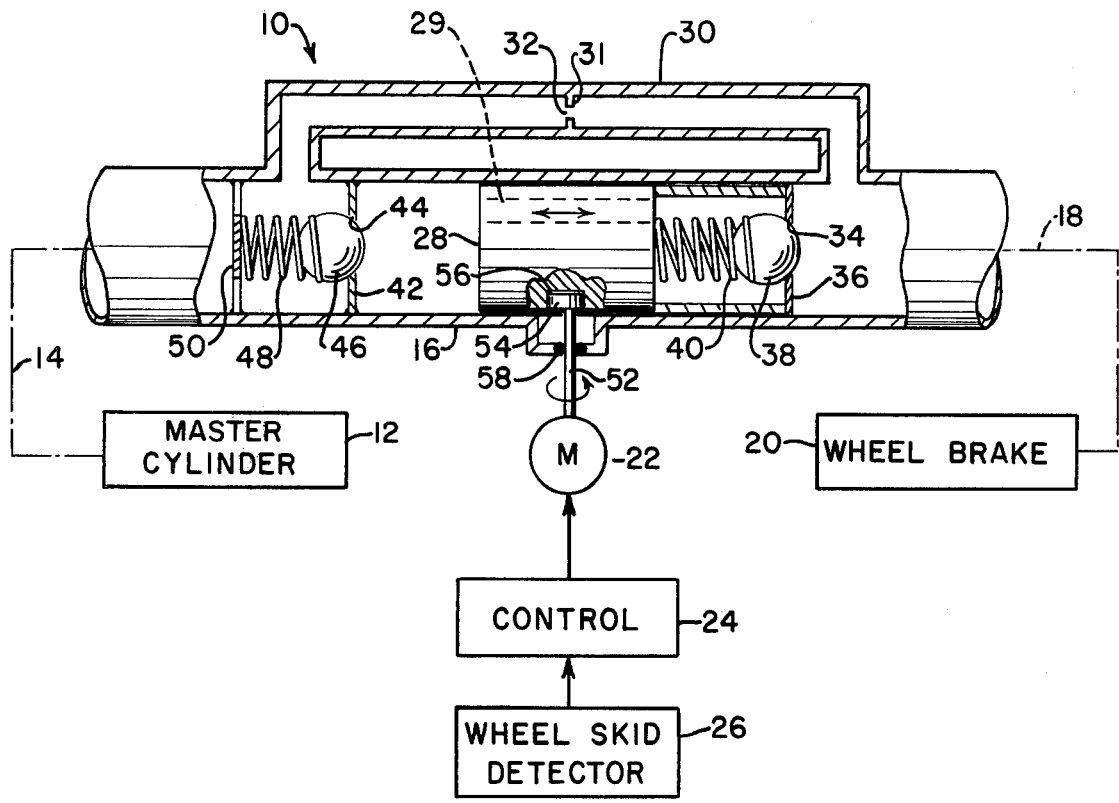

United States Patent [19]

Haney

[11] 4,113,323

[45] Sep. 12, 1978

[54] ANTI-SKID POWER VALVE

[75] Inventor: James Richard Haney, Uniontown, Ohio

[73] Assignee: Goodyear Aerospace Corporation, Akron, Ohio

[21] Appl. No.: 806,796

[22] Filed: Jun. 15, 1977

[51] Int. Cl.² ............................................. B60T 8/10
[52] U.S. Cl. .................................... 303/115; 303/61
[58] Field of Search ............. 188/181 A; 303/54, 61, 303/113, 115, 116, 119

[56] References Cited

U.S. PATENT DOCUMENTS

| 3,361,487 | 1/1968 | Vriend ................................... 303/61 |
| 3,466,098 | 9/1969 | Pieren et al. ....................... 303/61 X |

*Primary Examiner*—Duane A. Reger
*Attorney, Agent, or Firm*—P. E. Milliken; V. L. Oldham; R. L. Weber

[57] ABSTRACT

An anti-skid power valve means for brake control apparatus, which valve means connects a pressure supply line to a wheel brake system, the valve means including a piston operably positioned in a chamber means, and a check valve means operably carried by the piston to cause flow of liquid from the wheel brake system to the pressure supply line when the piston is driven. Other means connect the pressure supply line to the wheel brake system and include a flow control orifice therein to permit by-pass liquid flow from the pressure supply line to the wheel brake system.

12 Claims, 2 Drawing Figures

ANTI-SKID POWER VALVE

BACKGROUND OF INVENTION

Heretofore there has been a great deal of development work in anti-skid systems for vehicles, and especially for aircraft. Many patents have been issued on different types of anti-skid apparatus and controls to endeavor to provide maximum braking capacity for the vehicle but at the same time to limit or prevent skid conditions from existing or being maintained. In these various commercial anti-skid systems and apparatus provided heretofore, it has usually been the practice to dump or release the fluid in the brake system for a skidding wheel into a reservoir and then resupply brake fluid when braking conditions are to be re-established. Usually the dumping of the hydraulic fluid in the brake pressure system causes a loss of position of the brake pedal which is not then in a full pressure producing position and the pedal needs to be depressed further to provide braking pressures. Or, in other words, such a quantity of brake pressure liquid has been dumped by brake pressure release that some appreciable pedal movement or time interval is involved in pressure reapplication. Naturally, any time loss in braking action is quite objectionable.

Furthermore, prior anti-skid systems of all types have been relatively expensive even when provided for small aircraft or other small vehicles.

With various advances in the anti-skid control art, the systems for preventing, eliminating or controlling anti-skid conditions have become more and more complex and have usually required sophisticated electronic controls. Examples of such systems are found in U.S. Pat. Nos. 3,856,365 and 3,880,475, but many other patents have been granted on anti-skid systems and on components thereof, such as U.S. Pat. Nos. 3,286,734; 3,443,594; and 3,486,801 on valves for use in anti-skid brake systems.

It is the general object of the present invention to provide an improved anti-skid control system utilizing an anti-skid power valve means therein, which valve means will release or remove only a portion of the pressure liquid in the brake system or means for a wheel having a skid condition existing thereon and to maintain hydraulic pressure fluid at reduced pressure in operative association with such wheel brake system.

Another object of the invention is to eliminate any full release of brake action or pressure lquid in correcting an anti-skid or skid condition.

Another object of the invention is to maintain brake pedal position in a brake system controlling a wheel having skid conditions existing therein and to signal the operator when relieving such skid producing braking pressure.

Yet another object of the invention is to provide a relatively simple, inexpensive, uncomplicated substantially mechanical apparatus for controlling skid conditions in a wheel and for removing the skid conditions without complete dumping of all pressure liquid in such wheel brake system.

Another object of the invention is to provide two mechanical controls in an anti-skid system that can be independently varied or be varied in correlation with each other for control of anti-skid and braking action.

The foregoing and other objects and advantages of the present invention will be made more apparent as the specification proceeds.

Figure 2:
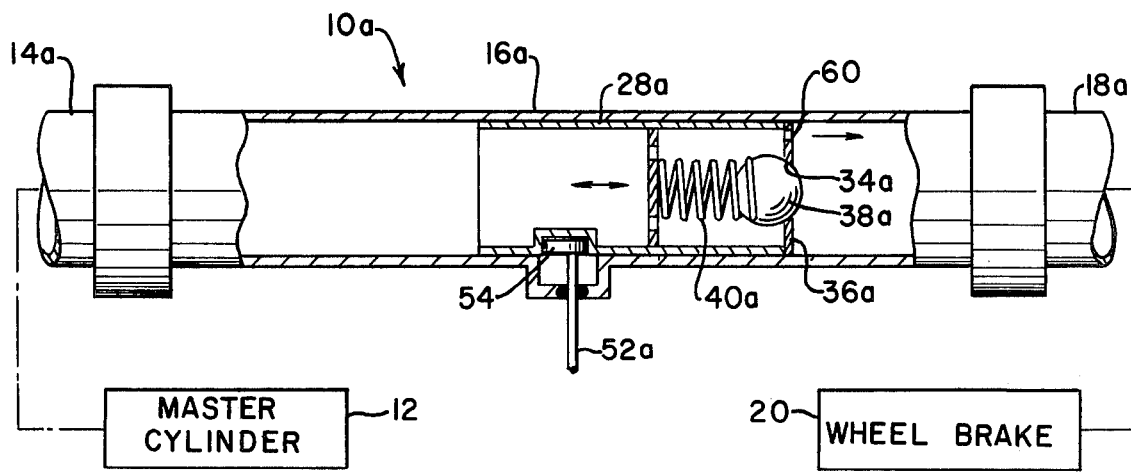

Reference now is particularly made to the accompanying drawings, wherein:

FIG. 1 is a longitudinal section, partly diagrammatic, through power valve apparatus comprising one embodiment of the principles of the invention; and FIG. 2 is a sectional view of a modification of the apparatus of FIG. 1 and comprising another embodiment of a power valve means connected in a hydraulic fluid braking system.

When referring to corresponding members shown in the drawings and referred to in the specification, corresponding numerals are used to facilitate comparison therebetween.

SUBJECT MATTER OF INVENTION

This invention, as one embodiment thereof, relates to a powered valve for use in an anti-skid brake control apparatus including a hydraulic pressure supply line, a wheel brake system including a pressure conduit, and an anti-skid power valve means operably connecting the pressure supply line to the pressure conduit of the wheel brake system, the power valve means including a driven device to force liquid from the brake pressure conduit back into the pressure supply line and another member to permit flow of liquid at a slower rate back to the brake pressure conduit from the pressure supply line. More specifically, such power valve means may include a piston operably positioned in a chamber means, a check valve means operably carried by the piston to aid in transmitting liquid from the brake pressure conduit to the pressure supply line, means connecting the pressure supply line to the brake pressure conduit and including a flow control orifice therein, and drive means operatively connecting to said piston to reciprocate the same to remove liquid from the pressure conduit for the wheel brake system and force it into the pressure supply line, the flow rate of the liquid through the orifice being smaller than the volume pumping rate of the driven piston; the drive means being controlled by an anti-skid system.

With reference to the details of the construction shown in the drawings, an anti-skid power valve of the invention is indicated as a whole by the numeral 10 and this device, termed a power valve, is connected into a braking system of a conventional type for control of skid conditions on an individual wheel or set of wheels having common brake forces exerted thereon. Thus, the brake control apparatus normally includes a conventional master cylinder 12 or a brake pedal assembly, etc. connecting through a pressure supply line 14 to one end of a tubular chamber 16 forming an enclosure for and a portion of the power valve of the invention. The opposite end of this power valve connects to a pressure line or conduit 18 extending to a known type of wheel brake means or system 20 for providing the brake action on an individual wheel (not shown).

FIG. 1 of the drawings also shows that a member in the power valve of the invention is driven by an electric motor 22 connecting to and controlled by a known anti-skid circuit represented by a control box 24 that in turn connects to and receives its operative signal from a conventional wheel skid detector, such as a transducer, indicated at 26. Such wheel skid detector would naturally be associated with the same wheel as the brake means 20 for providing a signal therefrom to show when skid conditions are set up on such wheel by the brake action.

The power valve 10 includes and operably positions a piston 28 in the chamber 16. Such chamber has a bypass tube 30 connecting from the pressure supply line 14 over to the pressure conduit for the brake means. Such conduit 18 and the line 14 connect to the chamber 16 and the bypass pipe or tube 30 in any conventional manner.

As a feature of the invention to be explained in more detail later on, the bypass tube 30 has a plate 31 or other member provided therein to define an orifice 32 in such bypass tube.

The piston 28 preferably is a tubular member, or it is axially apertured as at 29. The piston has a hole or opening 34 in an end plate 36 secured to the piston at an open end thereof adjacent the wheel brake pressure conduit 18. A conventional check valve, such as a ball 38, is resiliently pressed against the end plate 36 and the hole therein by a coil spring 40 based against another axially spaced portion or wall in the piston 28. The ball or check valve so provided is adapted to admit fluid into the piston 28 when it is moved axially towards the brake pressure conduit 18 and then to force such fluid to move towards the pressure supply line 14 when the piston is moved axially in that direction.

A companion check valve, which may be of any conventional construction is provided adjacent the opposite end of the chamber 16 and it comprises a baffle plate 42 secured in the chamber 16 to the walls thereof and which plate has a hole 44 therein that normally is closed by a ball 46. This ball is resiliently retained against one face of the plate 42 to close the hole 44 therein by a coil spring 48 the opposite end of which is biased against an apertured baffle plate 50 suitably secured in either the pressure supply line 14 or in an end portion of the chamber 16 whatever is most suitable to position the ball valve 46 in the manner shown, but yet to permit ready passage of liquid axially through and past the baffle plate. It should be noted that the valve formed by the ball 46 is positioned within the chamber and is not connected to or effected by the bypass tube 30 in any manner and likewise the position of the piston 28 in the chamber is such that it never interferes with the ends of the bypass tube where it connects to the chamber 16 or to the brake system pressure conduit line 18.

The drawing shows that the motor 22 has an output shaft 52 that extends into the chamber 16. Such output or drive shaft 52 engages the piston 28 to drive the same when anti-skid conditions exist. Thus, the shaft 52 has an eccentric or cam 54 on the end thereof that entends into the chamber and such cam or eccentric is suitably operably engaged with the piston as by engaging a recess 56 formed in one wall or side portion of the piston 28 to be snugly positioned therein. The drive shaft 52 is suitably sealed as at 58 in engagement with the chamber wall. Thus, when the motor 22 is driven, the piston is driven axially in a reciprocal manner in the chamber 16. Such action will force the ball 38 off of its seat on the end plate 36 when the piston is moved towards the conduit 18 and, as the piston moves towards the conduit or line 14, the piston forces a volume of fluid to move towards the line 14 and force the ball 46 off its seat on the plate 42 to return such pressure liquid to the pressure supply line 14. That liquid hence returns to the master cylinder and/or to the system connecting directly to the brake pedal and such return of liquid will be felt by the person actuating the brake pedal to indicate to such operator that a skid condition is existing, but that action is being taken to relieve the same.

Relatively small volumes of liquid are involved in these brake pressure systems for relieving anti-skid conditions and thus the volume of liquid pumped by the piston 28 could be, for example, in the range of about 0.15 gallon per minute. The pressures transmitted to the brake system pressure conduit 18 would be, for example, anything from about 300 to 400 psi up to about the maximum pressure to be exerted in the braking system, such as about 1000 psi for full braking action.

The piston 28 has a limited drive movement and its axial travel in the chamber 16 might be, for example, from about 0.02 inch to about 0.1 inch. The pumping action might transmit one ounce of fluid, for example, in about 0.1 second so as to, in effect, bleed off the brake pressure by removing a portion of the brake pressure liquid by this controllable drive of the piston during skid conditions.

In order to maintain some pressure in the brake pressure conduit 18 and not to remove an excessive amount of liquid therefrom, the orifice 32 is provided to permit some return flow of pressure liquid from the supply line 14 to the brake system conduit 18 through this orifice 32. Such orifice might be in the vicinity of about 0.027 inch in diameter and it is adapted to return pressure liquid to the brake system at a slower rate than the liquid is being pumped from the brake system pressure conduit. Hence, two correlated and variable members or factors are provided for controllably reducing brake pressures during skid conditions, but yet to adapt the system to operate to reapply brake pressures rapidly. The braking system does not fully lose its operative pressures.

Usually the piston 28 does not need to be sealed in the chamber 16 but conventional seal means can be associated therewith, if desired.

Obviously the type of control box 24 provided and the specific wheel skid detector 26 can be of any conventional type. Such means will drive the motor 22, which can be a relatively small horsepower size, such as from 1/10 to 1/25 of a horsepower and still obtain the desired action so as to reduce the braking pressures during anti-skid conditions as signaled by the apparatus controlling operation of this motor 22.

A slightly modified construction is shown in FIG. 2 of the invention wherein an anti-skid power valve 10a is shown. In this instance, a chamber or cylinder 16a connects to a fluid pressure supply line 14a and to the brake system pressure conduit 18a which conduits are in turn connected to the master cylinder and wheel brake means as in the embodiment of the invention shown in FIG. 1. A piston 28a is provided and it is tubular. An end wall 36a in this piston has a valve aperture 34a therein on which a ball valve 38a is seated as before. However, an additional orifice 60 is provided in this end plate 36a. Spring 40a is based on a multiple aperture support disk 62 affixed to the piston 28a and extending diametrically thereof. Hence, a simpler embodiment of the power valve of the invention is provided since the bypass tube of FIG. 1 is eliminated. Thus, drive of the shaft 52a operably connecting to the piston 28a in the same manner as previously described, reciprocates this piston axially. Hence, on movement of the piston toward the pressure supply line 14a, a volume of liquid will be driven back into the pressure supply line but such amount of liquid forced back into such line is modified by flow of liquid through the orifice 60 and staying in the brake pressure supply line system. Thus, the speed of drive of the piston 28, the length of its stroke, and the size of the orifice 60 can be correlated to provide a controlled withdrawal of liquid from the brake pressure system but yet the system can function to maintain the brake pressure system filled with liquid. The position of the brake pedal or other means controlling the pressure in the pressure supply line 14 need not be varied to any substantial degree and in all vents, the brake pedal position is not lost or rendered inoperative.

By the apparatus of the invention, a relatively uncomplicated brake pressure control means is provided for use with braking means for controlling skid conditions. Only two mechanical members are involved, i.e. the drive of the piston and return flow of pressure liquid through the flow orifice are present in the control whereby the action of the brake pressure reducing means can be mechanically and relatively simply controlled.

The orifices 32 and 60 are shown of exaggerated size in the drawing. The aperture 29 is made of any suitable size larger than the orifice 32.

The apparatus of the invention is not complex, is positive in action and is relatively inexpensive. Hence, the objects of the invention are believed to be achieved.

While two representative embodiments and details have been shown for the purpose of illustrating the invention, it will be apparent to those skilled in this art that various changes and modifications may be made therein without departing from the spirit or scope of the invention.

What is claimed is:

1. Brake control apparatus including a hydraulic pressure supply line, a wheel brake system, and an anti-skid power valve means operatively connecting the pressure supply line to the wheel brake system and comprising
   a driven means including a check valve to force liquid from the wheel brake system to the pressure supply line when skid conditions exist, and
   bypass means connecting said pressure supply line to the wheel brake system and including a flow control orifice to permit continual flow of pressure liquid to the wheel brake system, the flow rate of the liquid from the wheel brake system when said driven means are actuated being greater than the return pressure liquid flow through the orifice.

2. Brake control apparatus as in claim 1 where a second check valve is provided to aid in return of pressure liquid to said supply line and is spaced from and independent of said bypass means.

3. Brake control apparatus including a hydraulic pressure supply line, a wheel brake system, and an anti-skid power valve means operatively connecting the pressure supply line to the wheel brake system and comprising
   a piston operably positioned in a chamber means that connects said supply line to said brake system,
   a check valve means operatively carried by the piston to transmit liquid from the wheel brake system to the pressure supply line when the piston moves towards the wheel brake system,
   means connecting said pressure supply line to the wheel brake system and including a flow control orifice; and
   drive means connected to said piston to reciprocate the same to move liquid from the wheel brake system and force it into the pressure supply line, the flow rate of the liquid through the orifice being smaller than the volume pumping rate of the driven piston.

4. Brake control apparatus as in claim 3 where the wheel brake system includes hydraulically operated brake means and a supply conduit therefor, said check valve means connects to said supply conduit to pump liquid from the wheel brake system when skid conditions exist.

5. Brake control apparatus as in claim 3 wherein a second check valve means is positioned in said chamber means between said piston and the pressure supply line to aid in pressure flow of liquid to said pressure supply line when said piston moves toward said supply line.

6. Anti-skid brake control apparatus including a hydraulic pressure supply line, a wheel brake means having a pressure conduit, a signal generator for indicating skid conditions in the braked wheel, and an anti-skid valve means connecting the pressure supply line to the wheel brake means pressure conduit, wherein said valve means comprise
   a tubular piston positioned in a chamber means and having one apertured end wall,
   a check valve means operatively carried by the piston and engaging the end wall thereof to transmit liquid from the wheel brake means pressure conduit to the pressure supply line when the piston moves towards such supply line,
   bypass means including a flow control orifice operatively connecting said pressure supply line to said pressure conduit,
   drive means connected to said piston to reciprocate the same to move liquid from the wheel brake means and force it into the pressure supply line, the flow rate of the liquid through the orifice being smaller than the volume pumping rate of the driven piston; and
   means operatively connecting said signal generator to said drive means to energize the same when skid conditions exist one the wheel to reduce the braking pressure thereon.

7. An anti-skid brake control apparatus as in claim 6 and comprising a second check valve means positioned in said chamber means between said piston and the pressure supply line to aid in flow of liquid to said pressure supply line when said piston moves toward said pressure supply line.

8. In brake control apparatus as in claim 7 where cam and cam follower means connect said drive means to said piston to reciprocate the same.

9. In a brake control apparatus as in claim 7 where said piston has a recess in a peripheral wall area thereof forming a cam follower, said drive means include a rotary output shaft and a cam on said output shaft operatively engages said cam follower to drive and reciprocate said piston.

10. Brake control apparatus as in claim 3 where said piston is tubular and includes an end plate having a valve aperture therein and said check valve includes a ball resiliently urged against said valve aperture in said end plate, and said flow control orifice is formed in said end plate.

11. Brake control apparatus as in claim 10 where said connecting means includes the bore of said piston means and portions of the chamber means, said flow control orifice being open continuously.

12. Brake control apparatus as in claim 10 where said tubular piston has a recess in a wall area thereof forming a cam follower adapted for engagement with a cam on a driven output shaft to drive and reciprocate said piston.

* * * * *